US008479544B2

(12) United States Patent
Liu et al.

(10) Patent No.: US 8,479,544 B2

(45) Date of Patent: Jul. 9, 2013

(54) AUTO-UNLOCK ASSEMBLY FOR A TUBULAR LOCK

(75) Inventors: Xiu-Feng Liu, Tianjin (CN); Ming Chai, Tianjin (CN)

(73) Assignee: Eversafety Precision Industry (Tianjin) Co., Ltd., Tianjin (CN)

( * ) Notice: Subject to any disclaimer, the term of this patent is extended or adjusted under 35 U.S.C. 154(b) by 38 days.

(21) Appl. No.: 13/323,031

(22) Filed: Dec. 12, 2011

(65) Prior Publication Data

US 2013/0145800 A1 Jun. 13, 2013

(51) Int. Cl.
*E05B 13/10* (2006.01)
*F16C 3/00* (2006.01)

(52) U.S. Cl.
USPC ............... 70/224; 70/223; 70/472; 292/336.3

(58) Field of Classification Search
USPC ................... 70/149, 210, 215–218, 221–224, 70/467–489, 422, 380, 379 R, 379 A, DIG. 42
See application file for complete search history.

(56) References Cited

U.S. PATENT DOCUMENTS 5,301,526 A * 4/1994 Fann et al. ...................... 70/224
5,784,909 A * 7/1998 Huang ............................ 70/224
5,927,777 A * 7/1999 Kuo et al. ....................... 70/224
6,216,500 B1 * 4/2001 Kang ............................. 70/224
6,615,630 B2 * 9/2003 Wu et al. ......................... 70/472
6,742,367 B2 * 6/2004 Wu ................................ 70/224
6,807,833 B1 * 10/2004 Huang et al. .................... 70/107
6,993,945 B1 * 2/2006 Chen .............................. 70/472
7,100,407 B2 * 9/2006 Chen .............................. 70/224
7,472,571 B1 * 1/2009 Chang ............................ 70/472
7,559,219 B2 * 7/2009 Chen .............................. 70/224
8,113,021 B2 * 2/2012 Tsai ............................... 70/224

* cited by examiner

*Primary Examiner* — Christopher Boswell
(74) *Attorney, Agent, or Firm* — Hershkovitz & Associates, PLLC; Abraham Hershkovitz

(57) ABSTRACT

An auto-unlock assembly for a tubular lock has a rotating pipe, a rotating mount, a positioning board, a rotating spindle, a limiting mount, an retaining board and a limiting spring. The rotating pipe has a through hole. The rotating mount is connected to the rotating pipe and has two connecting wings. The positioning board is mounted in the rotating mount and has a body and two positioning wings. The rotating spindle is rotatably mounted through the rotating pipe and the positioning board via the rotating mount and has two protruding blocks. The limiting mount is mounted around the rotating spindle and has an acting face, a limiting recess and two mounting recesses. The retaining board is mounted around the rotating spindle, abuts the limiting mount and has a base and two protruding lugs. The limiting spring is mounted around the rotating spindle and abuts the retaining board.

1 Claim, 8 Drawing Sheets

AUTO-UNLOCK ASSEMBLY FOR A TUBULAR LOCK

BACKGROUND OF THE INVENTION

1. Field of the Invention

The present invention relates to an auto-unlock assembly, and more particularly relates to an auto-unlock assembly for a tubular lock that can be unlocked automatically.

2. Description of Related Art

A conventional tubular lock is securely mounted on a door to lock the door to prevent unauthorized access to a room. The conventional tubular lock usually has an exterior assembly, a latch and an interior assembly. The exterior assembly and the interior assembly are respectively mounted on opposite sides of the door and the latch is mounted on a sidewall of the door between the exterior assembly and the interior assembly. The exterior assembly has an outside knob and a lock to set the door in a lock condition. The interior assembly has an inside knob and a rotating button. The rotating button is rotatably mounted in the inside knob to lock or unlock the conventional tubular lock. When the conventional tubular lock is set in a lock condition, the inside knob and the outside knob cannot be rotated to open the door. A user needs to insert a key into the lock of the exterior assembly or to rotate the rotating button of the interior assembly to unlock the conventional tubular lock, and rotates the inside knob or the outside knob to open the door.

Although the rotating button of the interior assembly can be used to lock the conventional tubular lock inside the room without using the key, the user cannot open the door outside the room with rotating the rotating button. Then, the user cannot open the door quickly in s state of emergency when the conventional tubular lock is locked and the particular persons cannot use the conventional tubular conveniently.

The invention provides an auto-unlock assembly for a tubular lock that mitigates or obviates the aforementioned problems.

SUMMARY OF THE INVENTION

The main objective of the present invention is to provide an auto-unlock assembly for a tubular lock that can be unlocked automatically.

The auto-unlock assembly for a tubular lock in accordance with the present invention has a rotating pipe, a rotating mount, a positioning board, a rotating spindle, a limiting mount, an retaining board and a limiting spring. The rotating pipe is a hollow square pipe and has through hole. The rotating mount is hollow, is securely connected to the rotating pipe and has two connecting wings. The positioning board is mounted in the rotating mount and has a body and two positioning wings. The body has a central hole, two unlock regions, two lock regions and four positioning protrusions. The positioning wings are formed on and protrude from the body. The rotating spindle is rotatably mounted through the rotating pipe and the positioning board via the rotating mount and has two protruding blocks. The limiting mount is mounted around the rotating spindle and has an acting face, a limiting recess and two mounting recesses. The retaining board is mounted around the rotating spindle, abuts the limiting mount and has a base and two protruding lugs. The limiting spring is mounted around the rotating spindle and abuts the retaining board.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
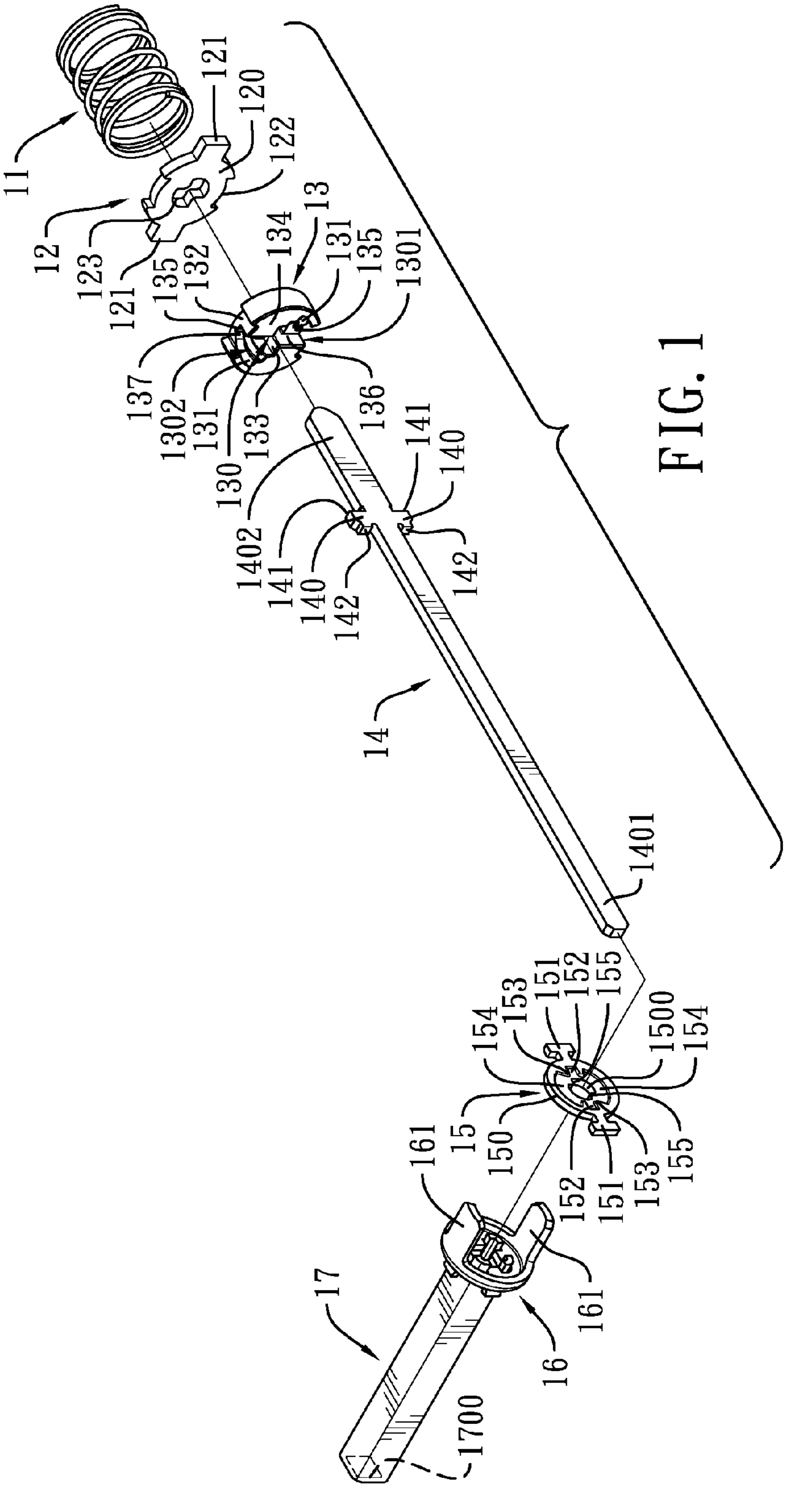
FIG. 1 is an exploded perspective view of the auto-unlock assembly for a tubular lock in accordance with the present invention.
Figure 2:
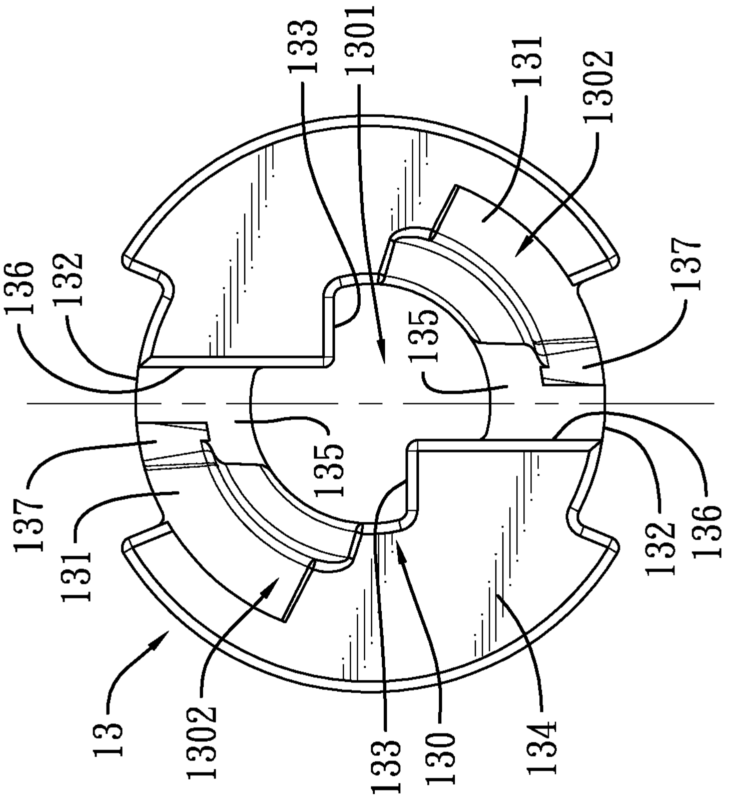
FIG. 2 is an enlarged side view of a limiting mount of the auto-unlock assembly in FIG. 1.

With reference to FIGS. 1 and 2, an auto-unlock assembly 10 in accordance with the present invention is mounted on a tubular lock and comprises a rotating pipe 17, a rotating mount 16, a positioning board 15, a rotating spindle 14, a limiting mount 13, a retaining board 12 and a limiting spring 11.

The rotating pipe 17 is a hollow square pipe and has a mounting end, a connecting end and a through hole 1700. The through hole 1700 is formed through the ends of the rotating pipe 17.

The rotating mount 16 is hollow, is securely connected to the connecting end of the rotating pipe 17 and has two connecting wings 161. The connecting wings 161 are formed on and protrude axially from the rotating mount 16 opposite to the rotating pipe 17 and parallel to each other.

The positioning board 15 is mounted in the rotating mount 16 and has a body 150 and two positioning wings 151. The body 150 may be circular, is mounted in the rotating mount 16 and has a center, a side face, a central hole 1500, two unlock regions 154, two lock regions 152 and four positioning protrusions 153. The side face of the body 150 is defined opposite to the rotating mount 16. The central hole 1500 is a splay hole and is formed through the center of the body 150 to form two straight edges 155 and has a shape. The unlock regions 154 are formed in the side face of the body 150 at intervals. The lock regions 152 are formed in the side face of the body 150 between the unlock regions 154. The positioning protrusions 153 are formed on and protrude from the side face between the unlock regions 154 and the lock regions 152. The positioning wings 151 are formed on and protrude from the body 150 and align with each other between the connecting wings 161 of the rotating mount 16.

The rotating spindle 14 is a flat shaft, is rotatably mounted through the rotating pipe 17 and the positioning board 15 via the rotating mount 16 and has a top face, a bottom face, an inner end 1401, an outer end 1402 and two protruding blocks 140. The inner end 1401 of the rotating spindle 14 extends through the central hole 1500 of the positioning board 15 and the through hole 1700 of the rotating pipe 17 via the rotating mount 16. Then, the rotating spindle 14 can be rotated relative to the positioning board 15 at an angle of 90 degrees by the central hole 1500 of the positioning board 15.

The protruding blocks 140 are respectively formed on and protrude from the top face and the bottom face of the rotating spindle 14 near the outer end 1402 of the rotating spindle 14 and each protruding block 140 has an outer side 141 and an inner side 142. The outer side 141 of the protruding block 140 is formed on the protruding block 140 and faces the outer end 1402 of the rotating spindle 14. The inner side 142 of the protruding block 140 is formed on the protruding block 140 opposite to the outer side 141 of the protruding block 140, faces the side face of the body 150 of the positioning board 15 and selectively mounted in one of the unlock regions 154 and the lock regions 152 of the body 150 of the positioning board 15.

The limiting mount 13 may be a circular block, is mounted around the rotating spindle 14 between the protruding blocks 140 and the outer end 1402 of the rotating spindle 14 and has a center, a centerline, an inner side, an outer side, an external surface face, an acting face 134, a limiting recess 130 and two mounting recesses 132. The external surface of the limiting mount 13 is annularly formed on the limiting mount 13 between the sides of the limiting mount 13. The acting face 134 is formed on the inner side of the limiting mount 13 and faces the outer sides 141 of the protruding blocks 140.

The limiting recess 130 is formed in the acting face 134, is formed through the centerline of the limiting mount 13 and has a through hole, a straight segment 1301 and two driving segments 1302. The through hole is formed through the center and the sides of the limiting mount 13 to enable the outer end 1402 of the rotating spindle 14 to extend out of the limiting mount 13 and has a shape corresponding to the shape of the central hole 1500 of the positioning board 15 to limit the rotating spindle 14 to rotate relative to the limiting mount 13 at an angle of 90 degrees.

The straight segment 1301 is radially formed through the limiting mount 13 along the centerline of the limiting mount 13, communicates with the through hole of the limiting recess 130 and has two bottoms 135 and two straight sides 136. The bottoms 135 are formed in the outer side of the limiting mount 13 beside the through hole of the limiting recess 130 along the centerline of the limiting mount 13. The straight sides 136 are respectively formed on and protrude from the bottoms 135 of the straight segment 1301 and are perpendicularly formed with the acting face 134 of the limiting mount 13.

The driving segments 1302 are formed in the acting face 134 beside the centerline of the limiting mount 13, communicate with the straight segment 1301 and each driving segment 1302 has a driving face 133, an oblique bottom 137 and an inclined face 131. The driving faces 133 are respectively formed with the straight sides 136 of the straight segment 1301 and are perpendicularly formed with the acting face 134 of the limiting mount 13. The oblique bottoms 137 are respectively and aslant formed on and protrude from the bottoms 135 of straight segment 1301. The inclined faces 134 are respectively and aslant formed between the corresponding driving faces 133 and the corresponding oblique bottoms 137 beside the centerline of the limiting mount 13. The limiting recess 130 can enable the protruding blocks 140 of the rotating spindle 14 to selectively rotate between the straight segment 1301 and the driving segments 1302 of the limiting recess 130.

The mounting recesses 132 are radially formed through the external surface of the limiting mount 13 to enable the connecting wings 161 of the rotating mount 16 to extend out of the limiting mount 13 and communicate with the limiting recess 130.

The retaining board 12 is mounted around the rotating spindle 14, abuts the outer side of the limiting mount 13 and has a base 120 and two protruding lugs 121. The base 120 is mounted around the rotating spindle 14 between the outer end 1402 of the rotating spindle 14 and the limiting mount 13, abuts the limiting mount 13 and has a center, an inner side, an outer side, an external surface, two mounting grooves 122 and a through hole 123. The inner side of the base 120 abuts the outer side of the limiting mount 13. The external surface of the base 120 is annularly formed on the base 120 between the sides of the base 120. The mounting grooves 122 are formed in the external surface of the base 120 at intervals and respectively align with the mounting recesses 132 of the limiting mount 13 to enable the connecting wings 161 of the rotating mount 16 to extend out of the base 120. The through hole 123 is formed through the center and the sides of the base 120 and has a shape corresponding to the shape of the through hole of the limiting mount 13 to limit the rotating spindle 14 to rotate relative to the retaining board 12 at an angle of 90 degrees. The protruding lugs 121 are radially formed on and protrude from the external surface of the base 120 between the mounting grooves 122.

The limiting spring 11 is mounted around the rotating spindle 14 between the retaining board 12 and the outer end 1402 of the rotating spindle 14 and abuts the outer side of the retaining board 12.

Figure 3:
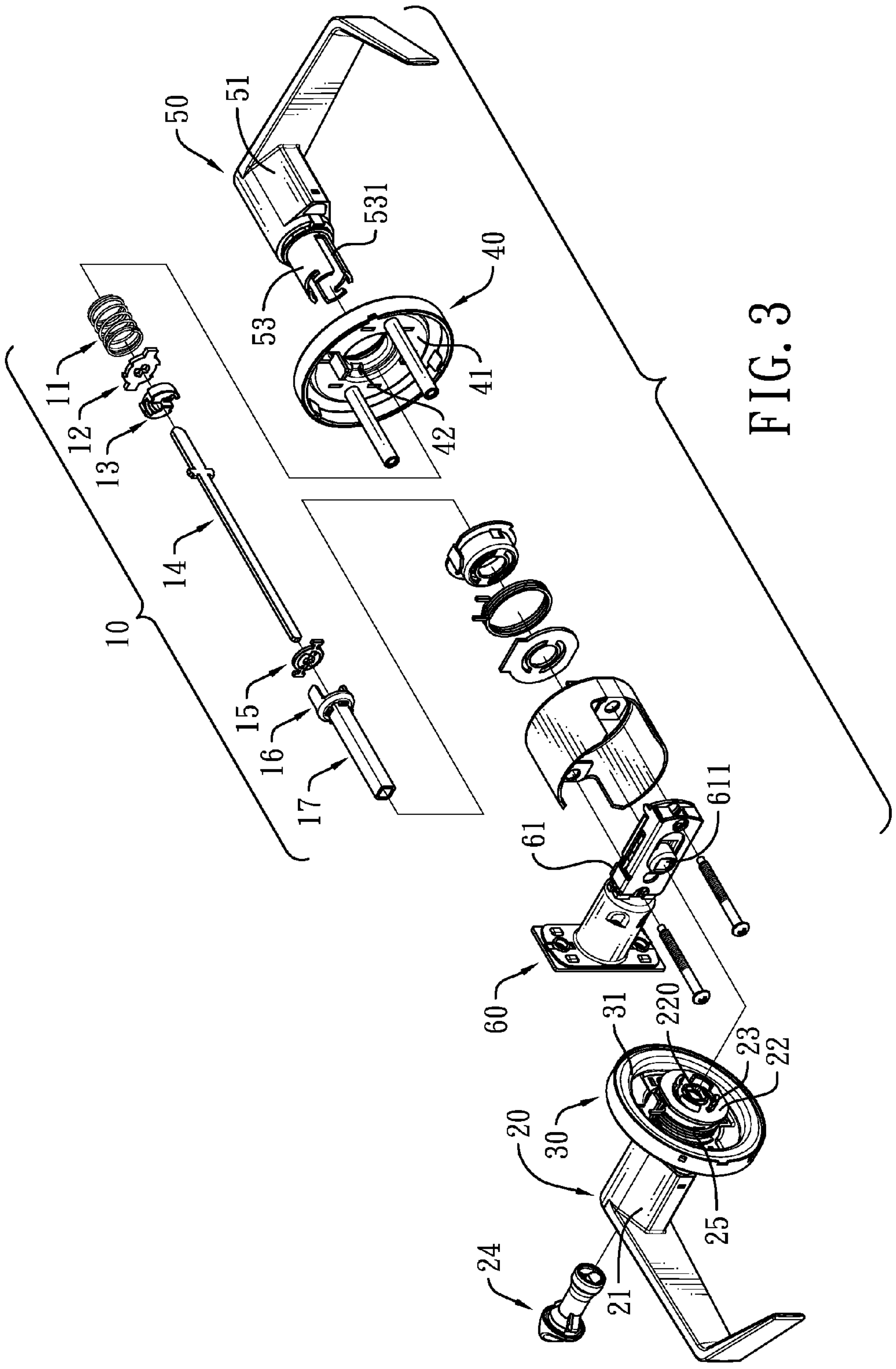
FIG. 3 is an exploded perspective view of a tubular lock with the auto-unlock assembly in FIG. 1.
Figure 4:
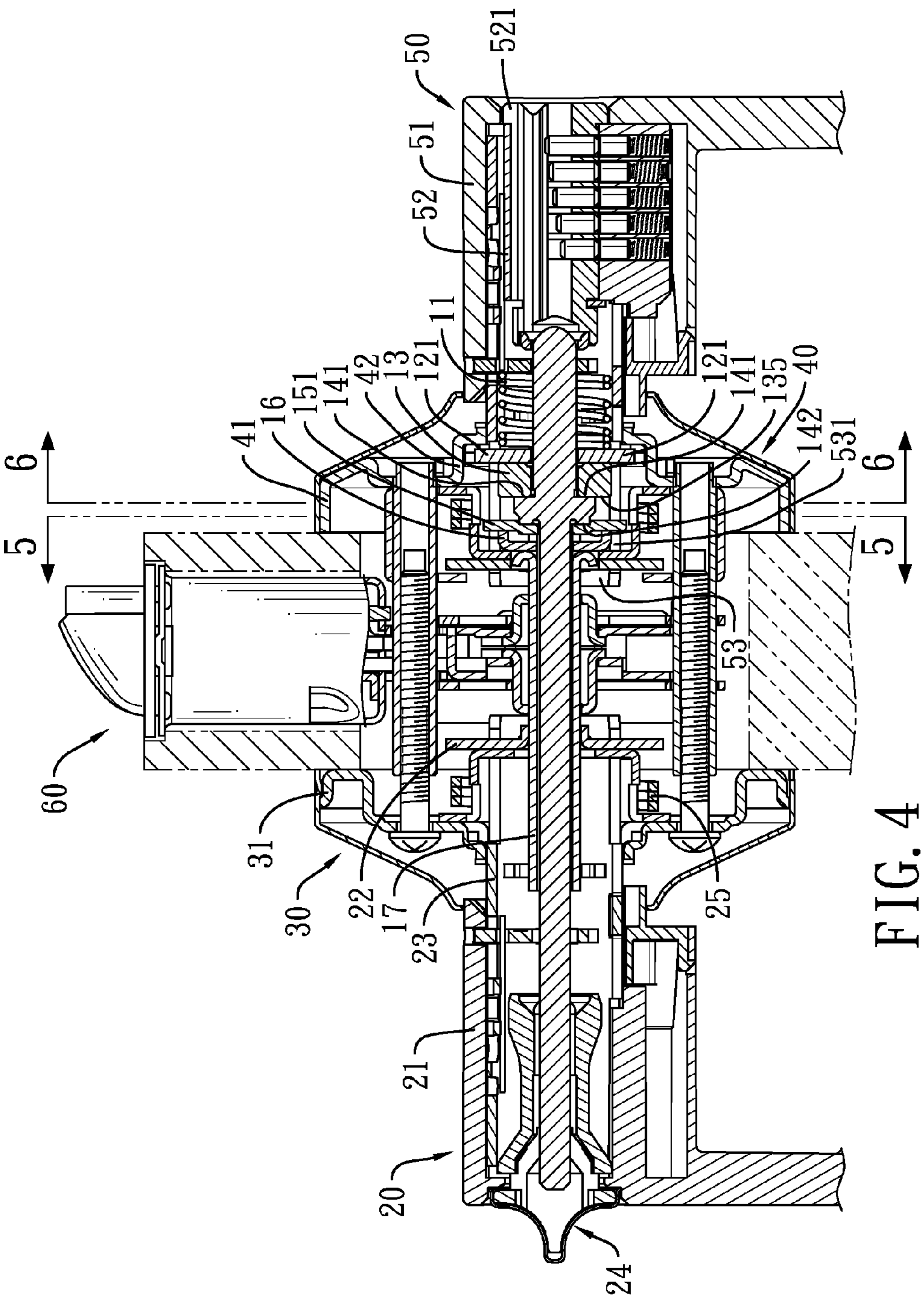
FIG. 4 is a top view in partial section of the auto-unlock assembly for a tubular lock in accordance with the present invention when the tubular lock is locked.

With reference to FIGS. 3 and 4, the auto-unlock assembly 10 in accordance with the present invention is mounted in a tubular lock, the tubular lock has a latch 60, an interior assembly 20 and an exterior assembly 50. The latch 60 is securely mounted in a sidewall of a door and has a bolt-driving element 61 and a latch bolt. The bolt-driving element 61 is securely mounted in the sidewall of the door and has a mounting end, a locking end and a rotating hole 611. The mounting end of the bolt-driving element 61 is mounted securely in the sidewall of the door. The locking end of the bolt-driving element 61 extends out of the sidewall of the door. The rotating hole 611 may be polygonal and is formed through the bolt-driving element 61 between the ends of the bolt-driving element 61 and is mounted around the rotating pipe 17 of the auto-unlock assembly 10. The latch bolt is movably mounted in the locking end of the bolt-driving element 61 and is driven by the bolt-driving element 61 to move relative to the sidewall of the door. When the rotating pipe 17 is rotated, the latch bolt of the latch 60 will be moved with the bolt-driving element 61 by the engagement between the rotating pipe 17 and the rotating hole 611 of the bolt-driving element 61.

The interior assembly 20 is securely mounted on an inner side of the door, is connected to the latch 60 and the auto-unlock assembly 10 and has an inner mounting board 31, an interior cap 30, an inner driving tube 23, a rotating board 22, a rotating spring 25, an inside knob 21 and a button assembly 24. The inner mounting board 31 is connected to the bolt-driving element 61, is mounted around the rotating spindle 14 and the rotating pipe 17 and abuts the inner side of the door. The interior cap 30 is mounted around the inner mounting board 31, is mounted on the inner side of the door and has an outside end. The inner driving tube 23 is rotatably mounted in the inner mounting board 31 around the rotating spindle 14 and the rotating pipe 17 and has an inside end and an outside end. The inside end of the inner driving tube 23 extends into the door and is mounted around the rotating pipe 17. The outside end of the inner driving tube 23 extends out of the outside end of the interior cap 30. The inner end 1401 of the rotating spindle 14 extends out of the outside end of the inner driving tube 23.

The rotating board 22 is mounted securely on the inside end of the inner driving tube 23, is securely mounted around the rotating pipe 17 and has a center and a driving square hole 220. The driving square hole 220 is formed through the center of the rotating board 22 and is mounted securely around the rotating pipe 17. The rotating spring 25 is mounted around the inner driving tube 23 between the mounting board 31 and the rotating board 22. The inside knob 21 is connected to the outside end of the interior cap 30, is securely mounted around the inner driving tube 23 and is mounted around the rotating spindle 14. The button assembly 24 is mounted in and extends out of the inside knob 24 and is securely mounted around the inner end 1401 of the rotating spindle 14. Then, the rotating pipe 17 can be rotated by the inside knob 21 via the inner driving tube 23 and the rotating board 22.

The exterior assembly 50 is securely mounted on an outer side of the door, is connected to the latch 60 and the auto-unlock assembly 10 and has an outer mounting board 41, an exterior cap 40, an outside knob 51, an outer driving tube 53 and a lock 52.

The outer mounting board 41 is connected to the inner mounting board 31 via the bolt-driving element 61 by fasteners, is mounted around the rotating spindle 14 and abuts the outer side of the door and has an inner side, a central hole and two holding recesses 42. The inner side of the outer mounting board 41 faces the outer side of the door. The central hole is formed through the outer mounting board 41 and is mounted around the rotating spindle 14. The holding recesses 42 are formed in the inner side of the outer mounting board 41 beside the central hole of the outer mounting board 41 and are corresponding to the protruding lugs 121 of the retaining board 12. The exterior cap 40 is mounted around the outer mounting board 41, is mounted on the outer side of the door and has an outside end. The outside knob 51 is connected to the outside end of the exterior cap 40 around the outer end 1402 of the rotating spindle 14 and has an inside end.

The outer driving tube 53 is connected to the inside end of the outside knob 51, is mounted through the central hole of the outer mounting board 41 around the limiting spring 11, the retaining board 12, the limiting mount 13, the positioning board 15 and the rotating mount 16 of the auto-unlock assembly 10 and has an external surface and two driving grooves 531. The driving grooves 531 are formed through the external surface of the outer driving tube 53 at intervals and are mounted around the protruding lugs 121 of the retaining board 12 and the positioning wings 151 of the positioning board 15. Then, the limiting spring 11 is mounted between the base 120 of the retaining board 12 and the outer driving tube 53, and the retaining board 12 and the positioning board 15 can be rotated with the outer driving tube 53. The lock 52 is mounted in the outside knob 51 and has a lock core 521 connected to the outer end 1402 of the rotating spindle 14.

Figure 6:
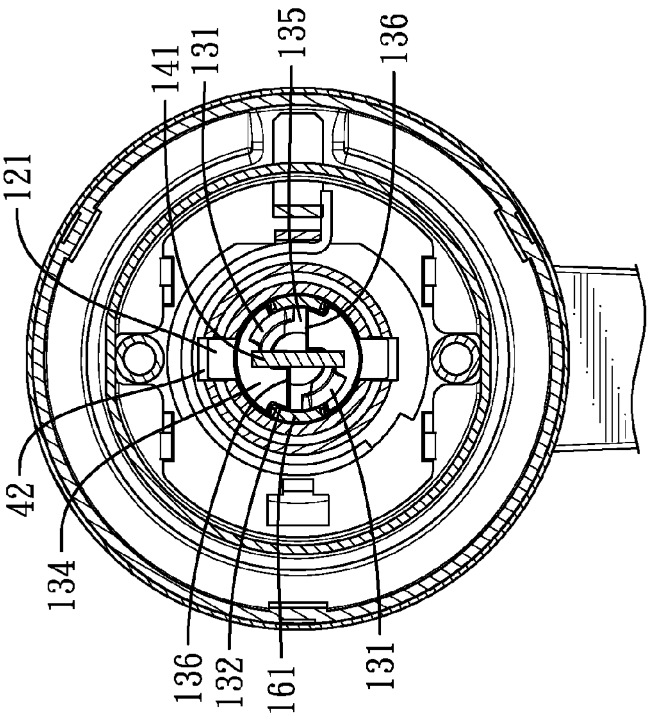
FIG. 6 is a side view in partial section of the auto-unlock assembly for a tubular lock in FIG. 4 along a 6-6 line.
Figure 5:
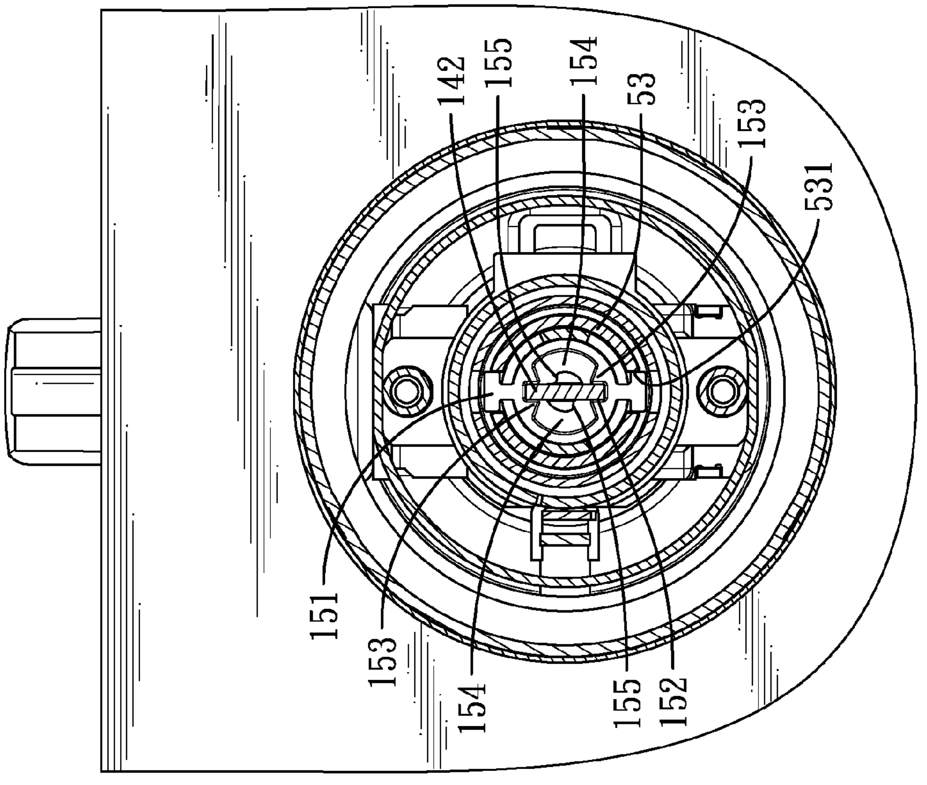
FIG. 5 is a side view in partial section of the auto-unlock assembly for a tubular lock in FIG. 4 along a 5-5 line.

With reference to FIGS. 4 to 6, when a user wants to lock the door, the user can rotate the button assembly 24 to enable the rotating spindle 14 to rotate with the button assembly 24. Then, the outer sides 141 of the protruding blocks 140 will separate from the bottoms 135 of the straight segment 1301 of the limiting recess 130. Due to the pushing force of the limiting spring 11 to the retaining board 12 and the limiting mount 13, the outer sides 141 of the protruding blocks 140 will rotate and abut the limiting mount 13 along the inclined faces 131 of the driving segments 1302. When the outer sides 141 of the protruding blocks 140 are rotated with the button assembly 24 and move to the acting face 134 of the limiting mount 13, the retaining board 12 will be pushed outwardly to the outer mounting board 41 to enable the protruding lugs 121 to move into and be held in the holding recesses 42 of the outer mounting board 41. Then, the outside knob 51 cannot be rotate to open the door because of the outer mounting board 41 is mounted securely on the outer side of the door and the protruding lugs 121 of the retaining board 12 are mounted in the driving grooves 531 of the outer driving tube 53. In the lock condition, the connecting wings 161 of the rotating mount 16 are separated from the mounting grooves 122 of the retaining board 12, and the inside knob 21 can rotate the rotating pipe 17 via the inner driving tube 23 and the rotating board 22.

When the user inserts a key into the lock 52 of the exterior assembly 50 to rotate the lock core 521 to lock the door, the rotating spindle 14 will be rotated with the lock core 521 of the lock 52. Then, the outer sides 141 of the protruding blocks 140 will separate from the bottoms 135 of the straight segment 1301 of the limiting recess 130. Due to the pushing force of the limiting spring 11 to the retaining board 12 and the limiting mount 13, the outer sides 141 of the protruding blocks 140 will rotate and abut the limiting mount 13 along the inclined faces 131 of the driving segments 1302. When the outer sides 141 of the protruding blocks 140 are rotated with the lock core 521 and move to the acting face 134 of the limiting mount 13, the retaining board 12 will be pushed outwardly to the outer mounting board 41 to enable the protruding lugs 121 to move into and be held in the holding recesses 42 of the outer mounting board 41. Then, the outside knob 51 cannot be rotate to open the door because of the outer mounting board 41 is mounted securely on the outer side of the door and the protruding lugs 121 of the retaining board 12 are mounted in the driving grooves 531 of the outer driving tube 53. In the lock condition, the connecting wings 161 of the rotating mount 16 are separated from the mounting grooves 122 of the retaining board 12, and the inside knob 21 can rotate the rotating pipe 17 via the inner driving tube 23 and the rotating board 22.

After locking the door by the above-mentioned operations, due to the pushing force of the limiting spring 11, the inner sides 142 of the protruding blocks 140 are respectively moved in and abut the lock regions 152 between the positioning protrusions 153 of the positioning board 15, and the outer sides 141 of the protruding blocks 140 abut the acting face 134 of the limiting mount 13. Consequently, the rotating spindle 14 cannot be rotated by the exterior assembly 50 in the lock condition and this can provide a preferred positioning effect and locking effect to the tubular lock.

In the lock condition as shown in FIGS. 4 to 6, the user can rotate the inside knob 21 downwardly (in a clockwise direction) to enable the rotating pipe 17 to rotate with the inside knob 21 via the inner driving tube 23 and the rotating board 22 without rotating the button assembly 24. With reference to FIGS. 7 to 11, when the rotating pipe 17 is rotated with the inside knob 21, the rotating mount 16 will be rotated with the rotating pipe 17. Due to the engagement between the connecting wings 161 and the mounting recesses 132 of the limiting mount 13, the limiting mount 13 will rotate with the rotating mount 16 in a clockwise direction. Then, the driving faces 133 of the limiting mount 13 will respectively abut the outer sides 141 of the protruding blocks 140 to enable the rotating spindle 14 to rotate with the limiting mount 13. At this time, the inner sides 142 of the protruding blocks 140 will respectively move out of the lock regions 152 of the positioning board 15, move on the positioning protrusions 153 to press the limiting spring 11 and move in the unlock regions 154 of the positioning board 15.

When the user puts the inside knob 21 off, the inside knob 21 can be rotated to the original position by the returning force of the rotating spring 25. During the re-rotating process, the driving faces 133 of the limiting mount 13 will separate from the protruding blocks 140 of the rotating spindle 14, and the limiting mount 13 will move inwardly by the elastic force of the limiting spring 11. After the limiting mount 13 returns to the original position, the inclined faces 131 of the limiting mount 13 respectively abut the outer sides 141 of the protruding blocks 140 to form a displacement between the limiting mount 13 and the retaining board 12. Then, the retaining board 12 will move inwardly to push the limiting mount 13 by the elastic force of the limiting spring 11, and the rotating spindle 14 will rotate with the limiting mount 13 to enable the outer sides 141 of the protruding blocks 140 to respectively move in the bottoms 135 of the straight segment 1301 of the limiting recess 130 and the inner sides 142 of the protruding blocks 140 to respectively move in the unlock regions 154 of the positioning board 15. At this time, the rotating spindle 14 is limited between the through hole of the limiting mount 13 and the central hole 1500 of the positioning board 15 and cannot be rotated and this can provide a preferred positioning effect to the tubular lock.

Consequently, due to the above-mentioned operations, the user can open the door by rotating the inside knob 21 to enable the tubular lock to switch in an unlock condition without rotating the button assembly 24 and this is convenient in use. In the meantime, the button assembly 24 can be rotated with the rotating spindle 14 and the protruding lugs 121 of the retaining board 12 can be moved out of the holding recesses 42 by the elastic force of the limiting spring 11. Then, the outer driving tube 53 can be rotated relative to the door to unlock the lock 52 of the outside knob 51.

Figure 11:
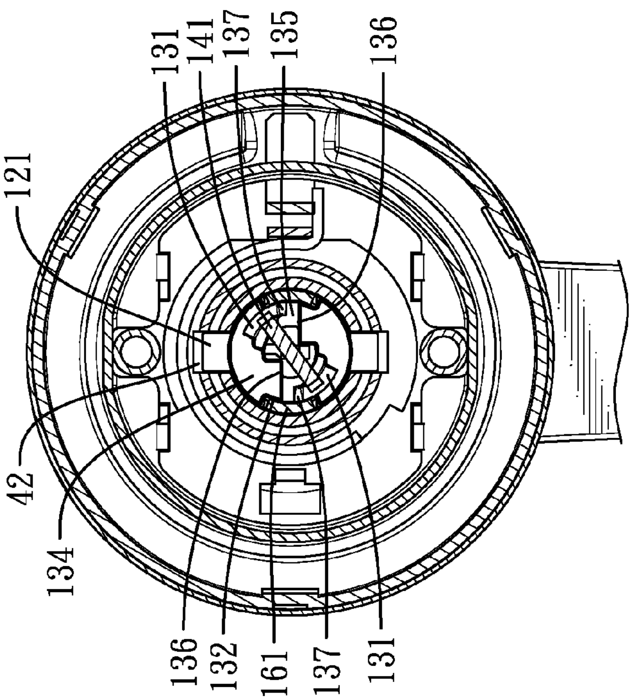
FIG. 11 is an operational side view in partial section of the auto-unlock assembly for a tubular lock in FIG. 9.
Figure 10:
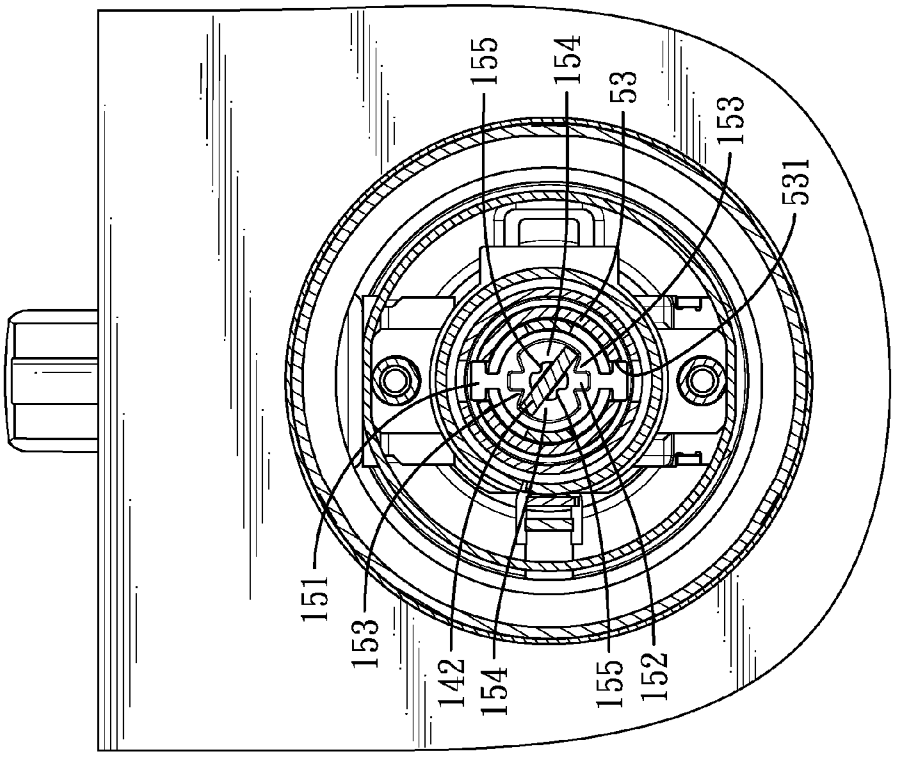
FIG. 10 is an operational side view in partial section of the auto-unlock assembly for a tubular lock in FIG. 8.

In addition, when the tubular lock is set up in a lock condition, the user also can rotate the inside knob 21 upwardly (in a counterclockwise direction) to enable the rotating pipe 17 to rotate with the inside knob 21 via the inner driving tube 23 and the rotating board 22 without rotating the button assembly 24. When the rotating pipe 17 is rotated with the inside knob 21, the rotating mount 16 will be rotated with the rotating pipe 17. Due to the engagement between the connecting wings 161 and the mounting recesses 132 of the limiting mount 13, the limiting mount 13 will rotate with the rotating mount 16 in a counterclockwise direction. Then, the outer sides 141 of the protruding blocks 140 abut the acting face 134 of the limiting mount 13 by the elastic force of the limiting spring 11. When the limiting mount 13 is rotated in a counterclockwise direction with the inside knob 21, the outer sides 141 of the protruding blocks 140 will separate from the acting face 134 and respectively move into the inclined faces 131 of the limiting mount 13 as shown in FIGS. 10 and 11.

When the inside knob 21 is rotated to return to the original position by the returning force of the rotating spring 25, the elastic force of the limiting spring 11 will enable the outer sides 141 of the protruding blocks 140 to keep moving along the inclined faces 131 of the limiting mount 13. At the same time, the inner sides 142 of the protruding blocks 140 will respectively move out of the lock regions 152 of the positioning board 15, move on the positioning protrusions 153 to press the limiting spring 11 and move in the unlock regions 154 of the positioning board 15. After the rotating spindle 14 rotates in a clockwise direction at 90 degrees, the outer sides 141 of the protruding blocks 140 will move in the bottoms 135 of the straight segment 1301 of the limiting recess 130 and the inner sides 142 of the protruding blocks 140 respectively move in the unlock regions 154 of the positioning board 15. At this time, the rotating spindle 14 is limited between the through hole of the limiting mount 13 and the central hole 1500 of the positioning board 15 and cannot be rotated and this can provide a preferred positioning effect to the tubular lock as shown in FIGS. 8 and 9.

Consequently, due to the above-mentioned operations, the user can open the door by rotating the inside knob 21 to enable the tubular lock to switch in an unlock condition without rotating the button assembly 24 and this is convenient in use. In the meantime, the button assembly 24 can be rotated with the rotating spindle 14 and the protruding lugs 121 of the retaining board 12 can be moved out of the holding recesses 42 by the elastic force of the limiting spring 11. Then, the outer driving tube 53 can be rotated relative to the door to unlock the lock 52 of the outside knob 51 as shown in FIG. 7.

Figure 7:
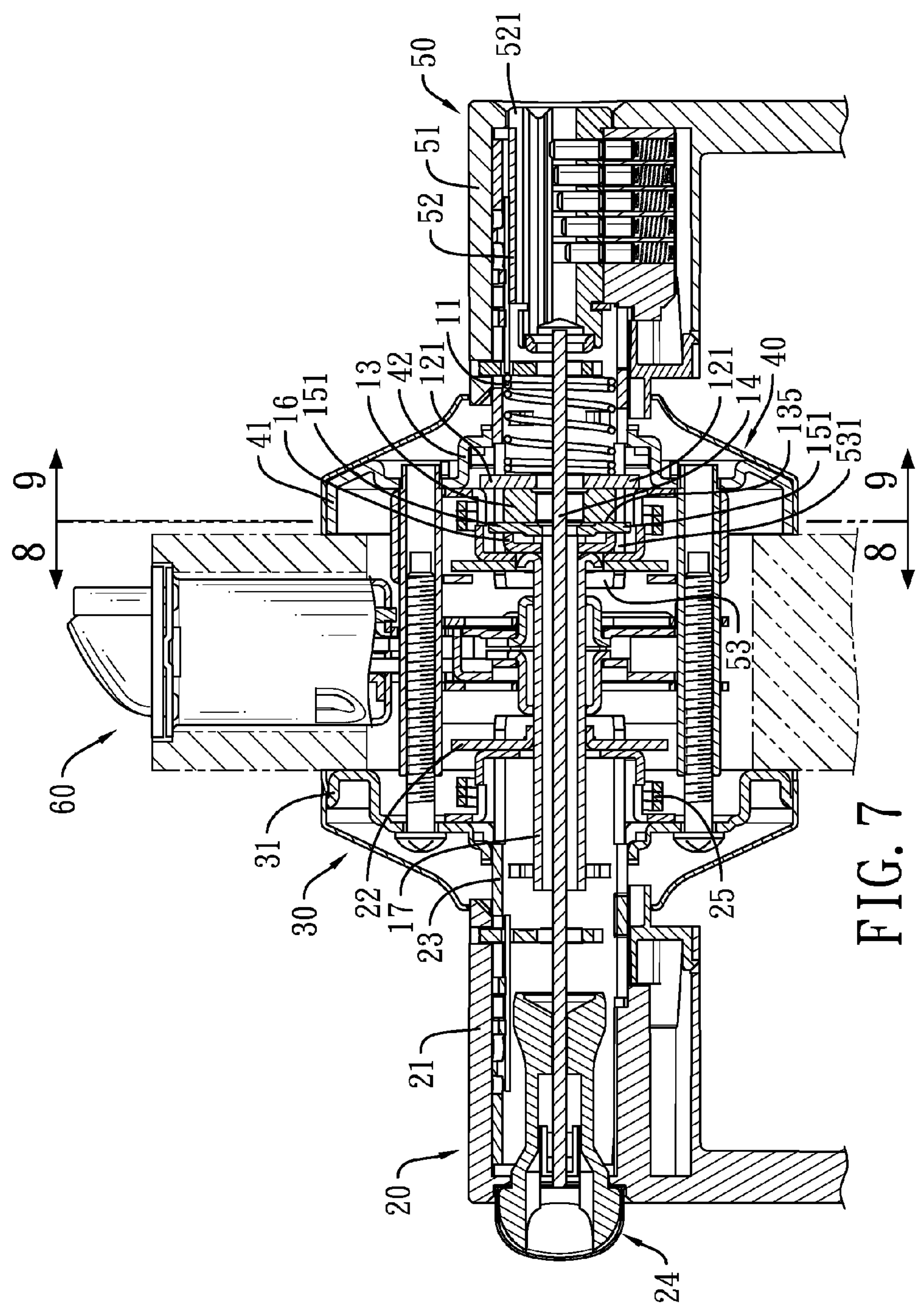
FIG. 7 is a top view in partial section of the auto-unlock assembly for a tubular lock in accordance with the present invention when the tubular lock is unlocked.
Figure 9:
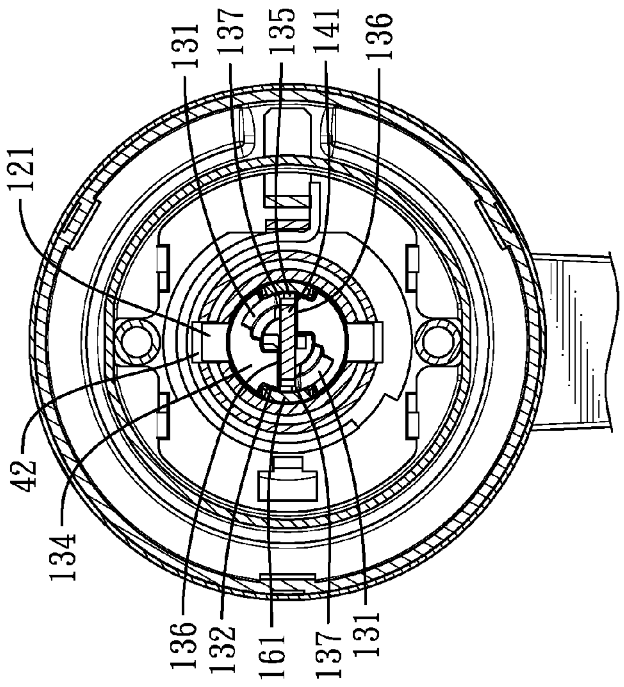
FIG. 9 is a side view in partial section of the auto-unlock assembly for a tubular lock in FIG. 7 along a 9-9 line.
Figure 8:
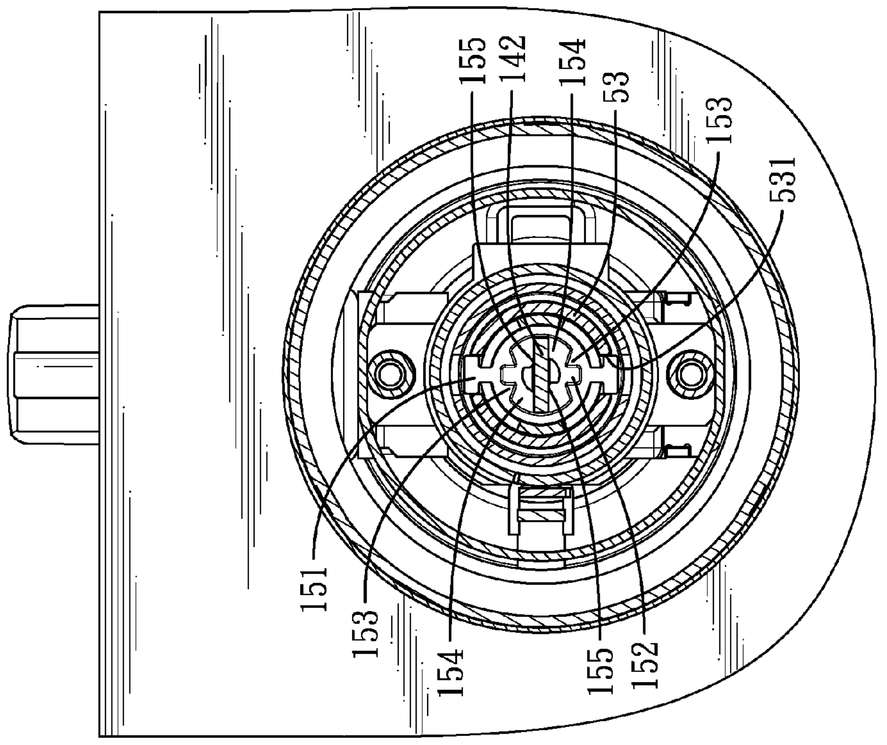
FIG. 8 is a side view in partial section of the auto-unlock assembly for a tubular lock in FIG. 7 along an 8-8 line.

After unlocking the tubular lock as shown in FIGS. 7, 8 and 9, the outer sides 141 of the protruding blocks 140 of the rotating spindle 14 are positioned between the straight edges 155 of the positioning board 15 and the straight sides 136 and the bottoms 137 of the driving segments 1302 of the limiting mount 13, and this can provide a preferred positioning effect to the rotating spindle 14. In addition, the inner sides 142 of the protruding blocks 140 move in the unlock regions 154 of the positioning board 15 and the outer sides 141 of the protruding blocks 140 move in the bottoms 135 of the straight segment 1301 of the limiting mount 13 by the elastic force of the limiting spring 11.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An auto-unlock assembly for a tubular lock having an interior assembly, an inner mounting board, a latch, an outer mounting board and an exterior assembly and the auto-unlock assembly comprising a rotating pipe being a hollow square pipe and having
  a mounting end;
  a connecting end; and
  a through hole formed through the ends of the rotating pipe;
a rotating mount being hollow, securely connected to the connecting end of the rotating pipe and having
  two connecting wings formed on and protruding axially from the rotating mount opposite to the rotating pipe and parallel to each other;
a positioning board mounted in the rotating mount and having
  a body mounted in the rotating mount and having
    a center;
    a side face defined opposite to the rotating mount;
    a central hole being a splay hole, formed through the center of the body to form two straight edges and having a shape;
    two unlock regions formed in the side face of the body at intervals;

two lock regions formed in the side face of the body between the unlock regions; and four positioning protrusions formed on and protruding from the side face between the unlock regions and the lock regions; and two positioning wings formed on and protruding from the body and aligning with each other between the connecting wings of the rotating mount;

a rotating spindle being a flat shaft, rotatably mounted through the rotating pipe and the positioning board via the rotating mount and having a top face;

a bottom face;

an inner end extending through the central hole of the positioning board and the through hole of the rotating pipe via the rotating mount;

an outer end; and two protruding blocks respectively formed on and protruding from the top face and the bottom face of the rotating spindle near the outer end of the rotating spindle and each protruding block having an outer side formed on the protruding block and facing the outer end of the rotating spindle; and an inner side formed on the protruding block opposite to the outer side of the protruding block, facing the side face of the body of the positioning board and selectively mounted in one of the unlock regions and the lock regions of the body of the positioning board;

a limiting mount being circular, mounted around the rotating spindle between the protruding blocks and the outer end of the rotating spindle and having a center;

a centerline;

an inner side;

an outer side;

an external surface face annularly formed on the limiting mount between the sides of the limiting mount;

an acting face formed on the inner side of the limiting mount and facing the outer sides of the protruding blocks;

a limiting recess formed in the acting face, formed through the centerline of the limiting mount and having a through hole formed through the center and the sides of the limiting mount to enable the outer end of the rotating spindle to extend out of the limiting mount and having a shape corresponding to the shape of the central hole of the positioning board to limit the rotating angle of the rotating spindle relative to the limiting mount;

a straight segment radially formed through the limiting mount along the centerline of the limiting mount, communicating with the through hole of the limiting recess and having two formed in the outer side of the limiting mount beside the through hole of the limiting recess along the centerline of the limiting mount; and two straight sides respectively formed on and protruding from the bottoms of the straight segment and perpendicularly formed with the acting face of the limiting mount; and two driving segments formed in the acting face beside the centerline of the limiting mount, communicating with the straight segment and each driving segment having a driving face formed with one of the straight sides of the straight segment and perpendicularly formed with the acting face of the limiting mount;

an oblique bottom aslant formed on and protruding from one of bottoms of straight segment; and an inclined face aslant formed between the driving face and the oblique bottom beside the centerline of the limiting mount;

wherein the limiting recess can enable the protruding blocks of the rotating spindle to selectively rotate between the straight segment and the driving segments of the limiting recess; and two mounting recesses radially formed through the external surface of the limiting mount to enable the connecting wings of the rotating mount to extend out of the limiting mount and communicating with the limiting recess;

an retaining board mounted around the rotating spindle, abutting the outer side of the limiting mount and having a base mounted around the rotating spindle between the outer end of the rotating spindle and the limiting mount, abutting the limiting mount and having a center;

an inner side abutting the outer side of the limiting mount;

an outer side;

an external surface annularly formed on the base between the sides of the base;

two mounting grooves formed in the external surface of the base at intervals and respectively aligning with the mounting recesses of the limiting mount to enable the connecting wings of the rotating mount to extend out of the base; and a through hole formed through the center and the sides of the base and having a shape corresponding to the shape of the through hole of the limiting mount to limit the rotating angle of the rotating spindle relative to the retaining board; and two protruding lugs radially formed on and protruding from the external surface of the base between the mounting grooves; and a limiting spring mounted around the rotating spindle between the retaining board and the outer end of the rotating spindle and abutting the outer side of the retaining board.

* * * * *